United States Patent [19]
Durfee

[11] Patent Number: 4,601,927
[45] Date of Patent: Jul. 22, 1986

[54] WELDING OF PLASTIC PARTS

[75] Inventor: David W. Durfee, Rochester, N.Y.

[73] Assignee: Hydroacoustics, Inc., Rochester, N.Y.

[21] Appl. No.: 609,386

[22] Filed: May 11, 1984

[51] Int. Cl.⁴ ............................................. B29C 65/06
[52] U.S. Cl. .................................... 428/35; 156/73.5; 156/292; 156/304.6; 156/309.6; 156/580; 264/68; 264/248
[58] Field of Search .................. 156/73.1, 73.5, 304.5, 156/304.6, 309.6, 580.1, 580, 292, 73.6; 264/23, 68, 248; 428/35

[56] References Cited

U.S. PATENT DOCUMENTS 3,483,066 12/1969 Harris et al. ........................... 264/23
3,501,110 3/1970 Hopgood et al. ..................... 264/68
3,602,257 8/1971 Berleyoung et al. .............. 156/73.1
4,190,093 2/1980 Kearney et al. ................... 156/73.5
4,259,419 3/1981 Uba et al. ........................... 156/73.1

Primary Examiner—Michael Wityshyn
Attorney, Agent, or Firm—Martin LuKacher

[57] ABSTRACT

Joints between thermoplastic parts are friction welded (e.g., as by vibration welding) or otherwise thermally welded in such a manner that a non-uniform temperature distribution results during welding which effectively blocks flash flow from the edge of the joint, and upon cooling, produces a joint that is at least partially stress relieved and is resistant to solvent-induced crazing and cracking. Joints may employ nonparallel adjoining surfaces and/or flexural lips, which bend slightly under pressure applied during welding so as to produce a non-uniform pressure distribution and nonparallel welding surface over at least a portion of the resulting weld near the outside edge. In addition, one or more axial grooves may be used to isolate the nonparallel or lipped area of the weld from the remainder of the weld area so as to increase the lip compliance and reduce the effective pressure of molten material acting on the lip during welding.

33 Claims, 18 Drawing Figures

WELDING OF PLASTIC PARTS

DESCRIPTION

The present invention relates to plastic welding and particularly to methods and apparatus for producing plastic welds with controlled flash flow and with stresses therein at least partially relieved at the outside edges (which may later be exposed to solvents), so as to reduce the susceptibility of the welds to solvent-induced cracking or crazing, and also to plastic parts fabricated in accordance with such methods to provide effectively self-sealed welded joints, that is, joints which are resistant to solvent-induced cracking, with or without secondary stress relief treatment or application of sealants.

The invention is especially suitable for use in producing plastic welds by vibration welding, hot plate welding, or other thermal welding processes, in the production of automotive plastic parts such as bumpers and lamp housings, as well as the welding of other plastic parts which are subject to solvent-induced crazing or cracking. The invention is adapted for use in the plastic welding of various plastic materials such as polycarbonates, polycarbonate/polyester blends (such as Xenoy, a trademark of General Electric Company), polyvinylchloride (PVC), nylon, and other thermoplastics.

Welded plastic joints, whether produced by friction welding (e.g. vibratory welding), hot-plate welding, or other current state-of-the-art thermal welding processes, normally contain residual tensile stresses, both in the weld zone and in the flash extruded from the joint. Residual stresses are believed to arise from differential expansion/contraction of material which occurs during the localized heating, melting, and cooling of material at the joint.

Under conditions of use with exposure to many solvents (such as gasoline and ethylene glycol found in automotive applications), the tensile-stressed areas are highly susceptible to solvent-induced crazing and cracking. Under applied mechanical loading, the solvent-induced cracks act as stress risers, and may seriously weaken the joint. Where a hermetically sealed joint is required, the solvent-induced cracks may cause functional leakage problems, even in the absence of mechanical loading.

In order to reduce susceptibility to solvent-induced crazing and cracking by current methods, welded joints are often stress relieved by radiant and/or convection heating. The welds may also be sealed to prevent exposure to solvents, by the application of urethane, vinyl, or hot-melt sealants to the edge of the weld. Such current methods are generally timeconsuming, expensive, and subject to defects in quality and effectiveness.

It has also been suggested that the stresses be relieved by applying compressing forces to the weld. Methods and apparatus for stress relief of plastic welds involving compression of the welds during or after the welding process (See U.S. patent applications Ser. No. 609,539 and Ser. No. 609,631 filed concurrently herewith in the names of J. V. Bouyoucos and D. W. Durfee, and assigned to the same assignee as the present application and U.S. Pat. Nos. 4,490,384 and 4,337,024, discussed therein). It is desirable, however, that the edges of the welded joint be stress relieved or sealed during weld formation and without the need for special processes or apparatus which must be used either during or after the weld is formed. In other words, it is desirable that the welded joint be effectively self-sealing (that is, inherently resistant to solvent-induced crack propagation).

It is the principal object of the present invention to provide improved methods for welding plastic parts which provide such self-sealing joints.

It is another object of the present invention to provide plastic parts having improved joints in which thermally-induced stresses are relieved, at least along the exposed edge of the weld, thereby reducing the susceptibility of the weld to solvent-induced cracking and crazing.

It is a still further object of the present invention to provide improved methods and apparatus for plastic welding in which stress relief arises out of the design of the surfaces which form the weld upon melting and fusing such that effectively self-sealed edges are formed during welding.

It is a still further object of the present invention to provide methods for plastic welding which provide for control of the flow of flash from the edge of the joint of the parts during welding and produces a joint which is resistant to cracking and crazing induced by solvents to which the edge may be exposed.

Briefly described, welding of plastic parts in accordance with the invention is operative to heat and melt non-uniformly the surfaces of the parts which form the weld joint. During heating, by friction (e.g. vibration welding) or other thermal welding processes, nonparallel adjoining surfaces may be used, for example, to produce a weld which begins toward the inside of the joint, and over time progresses toward the outside edge. Flash flow is restricted in that direction, and the resulting depth of melt, which is relatively thick in the inside of the joint, tapers rapidly to zero depth at the outside edge. The resulting weld joint adjacent to the outside edge is resistant to solvent-induced cracking and crazing and is effectively self-sealed. It is believed that during cooling of the joint after welding, differential thermal contraction occurs between the thicker melt zone at the inside of the joint and the thinner melt zone at the edge which effectively stresses the edge in such a way that the edge is at least partially stress-relieved and is highly resistant to the solvent-induced crazing or cracking. By using such methods to provide the outside or exposed edges of a plastic weld, the entire weld can be thereby protected from attack by solvents.

The foregoing and other objects and features and advantages of the invention, as well as presently preferred embodiments thereof and the best modes presently known for practicing the invention, will become more apparent from a reading of the following description, in connection with the accompanying drawings in which.

Figure 7:
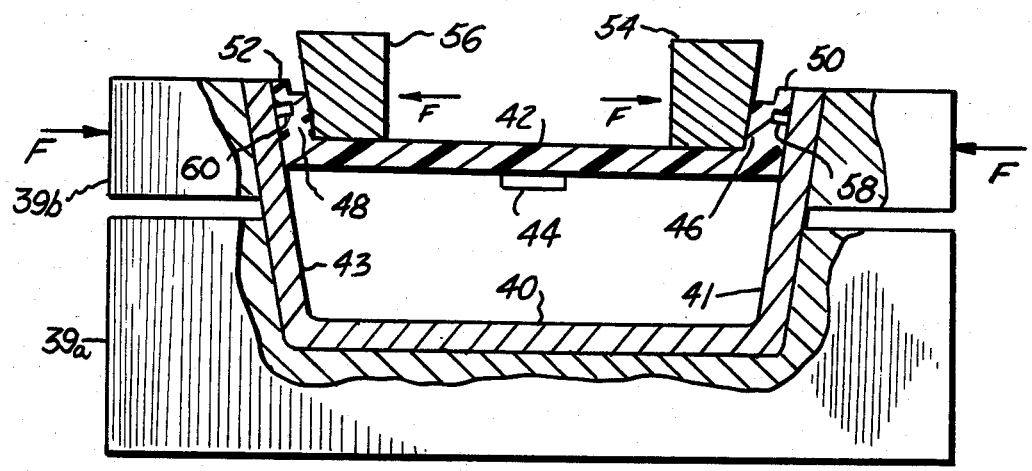

FIG. 7 is a fragmentary sectional view illustrating apparatus in accordance with still another embodiment of the invention for welding plastic parts of channel shape, which are strengthened by support members, such as may be used in automobile bumpers; and FIGS. 8 through 17 are fragmentary sectional views, illustrating plastic parts prior to welding in accordance with different embodiments of the invention.

Figure 1:
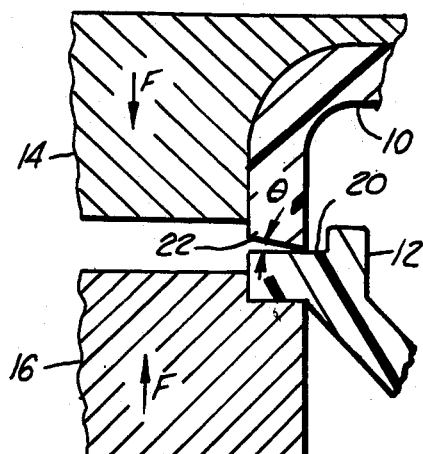
FIG. 1 is a fragmentary, sectional view showing apparatus for welding plastic parts which provide a welded joint in which stresses are relieved along the exposed edge of the joint, on the exterior of the welded parts (left side of FIG. 1), in accordance with an embodiment of the invention.
Figure 2:
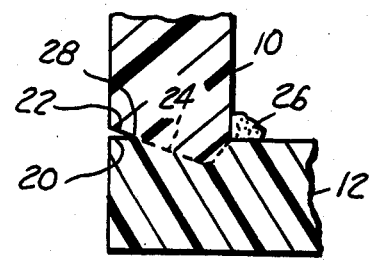
FIG. 2 is a fragmentary sectional view illustrating the welded joint produced in the parts through the use of the apparatus illustrated in FIG. 1.

Referring to FIGS. 1 and 2, there are shown two plastic parts 10 and 12 which may for example be the lens and reflector body, respectively, of an automobile lamp housing. In FIG. 1, the lens 10 and the body 12 are retained in upper and lower tooling assemblies 14 and 16 which are used in a vibration welding machine, such as illustrated in U.S. Pat. No. 4,086,122 issued Apr. 25, 1978 to J. V. Bouyoucos et al. The upper assembly 14 is connected to the drive plate of the vibration welding machine and the lower assembly 16 is connected to the lower platen thereof. Compressive clamping or loading forces are applied in a direction perpendicular to the surface 20 of the body 12 which forms the weld joint, as the lens 10 is vibrated. Vibration may be in a direction along the joint which is into and out of the plane of the Figure (i.e., perpendicular to the plane of the paper).

The surface 22 of the lens 10, which adjoins the surface 20 of the body 12 and participates in the formation of the weld joint, is beveled so that adjoining weld surfaces are nonparallel, with an initial gap between parts along the outside edge of the joint. The inner edge of the surface 22 comes first in contact with the surface 20 of the body 12 when the compressive forces are applied by the welding machine.

Beveling is one way in which the surfaces 20 and 22 which form the weld joint are disposed out of parallel relationship when they are brought together, and thereby can be non-uniformly melted. Where the parts are not closed shells or channels, their edges may be flat but held out of parallel relationship with each other by the assemblies which support them during welding. Another way of obtaining the out of parallel relationship and non-uniform heating and depth of melting of the surfaces is to provide a flexural lip facing the exposed side of the parts, as will be explained in greater detail in connection with FIGS. 3 and 4.

The geometry of the weld joint shown in FIG. 1 results in a non-uniform heating and resulting depth of melt, which occurs during vibratory welding. The melting initiates at the first line of contact which is on the inner edge of the surface 22, and as melt-down occurs, the contact progresses sideways toward the outer edge. There is a moving line of contact between relatively cold surfaces. This line of contact acts to seal the interface and blocks the flow of flash in the direction of the cold portion of the surfaces. That is, toward the exposed edge of the weld. The depth of melt is asymmetric and forms an asymmetric weld joint as illustrated by the dashed line 24 in FIG. 2. The flash 26 exits along the inside of the parts 10 and 12.

Without limiting the invention to any mechanism which explains the blocking of the flash flow and stress relief and sealing of the exposed edge of the weld, it is suggested that the effects are dependent on differential contraction of the non-uniform melt zone. The non-uniform depth of the zone in which melting occurs (the melt zone) and the contraction of the plastic material in this zone (the zone thinning out towards the exposed edge of the joint) results in high compressive forces at the outer line of contact. This line is illustrated at 28 in FIG. 2. These compressive forces effectively relieve the tensile stresses in the weld joint along the exposed edge. Since edge stresses are relieved, the joint is highly resistant to solvent-induced cracking or crazing.

The duration of welding (the time period while the vibration is applied), the amplitude of vibration, the applied compressive force, and the angle ($\theta$) between the surfaces 20 and 22 determine the width of joint material which is melted. If the melt-down is minimal, the width of the resulting weld zone (the length of the line 24 in FIG. 22) is too narrow. This may result in insufficient weld area and a moment arm length insufficient to produce stress relief along the exposed edge of the joint. If too much melt-down occurs, the weld zone can extend past the beveled edge. Outside flash then occurs and stress relief sealing does not occur. An effective criteria for determining the proper angle ($\theta$) and the proper welding parameters is the absence or presence of flash at the exposed edge of the joint.

It has been found that an angle $\theta$ between two degrees and fifteen degrees (2°–15°) is suitable for a wide range of plastic parts. The angle $\theta$ may extend to 30° or more in certain special cases.

Figure 3:
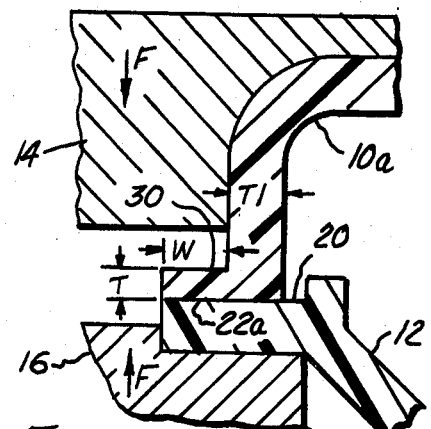
FIG. 3 is a fragmentary sectional view illustrating apparatus for plastic welding in accordance with another embodiment of the invention for providing a welded joint which is stress relieved along the exposed edge thereof.
Figure 4:
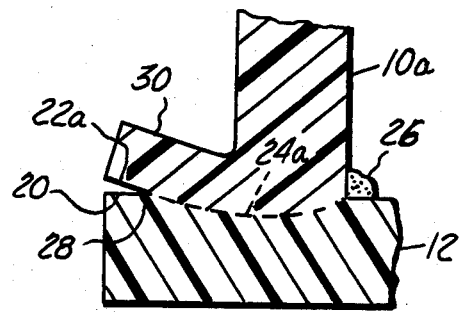
FIG. 4 is a fragmentary sectional view illustrating the welded joint produced by the operation of the apparatus shown in FIG. 3.

Referring to FIGS. 3 and 4 there is shown parts 10a and 12, which may also be lamp housing parts mounted in tooling assemblies 14 and 16 of a vibration welding machine. The tooling assemblies 14 and 16 and their use may be the same as explained in connection with FIGS. 1 and 2.

In FIGS. 3 and 4 the upper part (lens) 10a is provided with a lip 30. The lower surface 22a of the part 10a includes the lower surface of the lip 30 and adjoins and is pressed against the upper surface 20 of the body 12 during welding. The lip 30 is flexural. It is sufficiently compliant to flex, as the compressive forces are applied to the adjoining surfaces 20 and 22a during welding. The upper part 10a is supported (with clearance to the lip 30) so as to allow the lip 30 to flex. Accordingly, with the contact forces applied during welding, the lip bends back as melt-down occurs. The surfaces 20 and 22a therefore move out of parallel relationship in a portion of the weld joint, producing the non-uniform heating and depth of melt. The resulting welded joint is asymmetric as shown by dashed line 24a, in FIG. 4.

The width of the lip, indicated by "W" in FIG. 3, and the thickness of the lip, indicated by "T" also in FIG. 3, are selected dependent upon required welding parameters, part performance, and material properties so as to produce the desired degree of flexure during welding.

Figure 5:
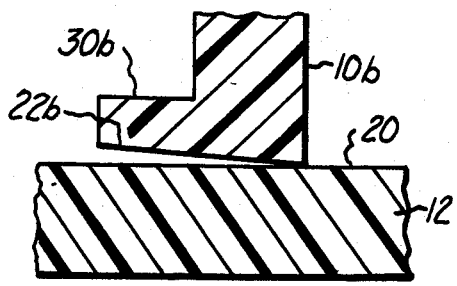
FIG. 5 is a fragmentary sectional view illustrating plastic parts which are welded in accordance with another embodiment of the invention, prior to welding.
Figure 6:
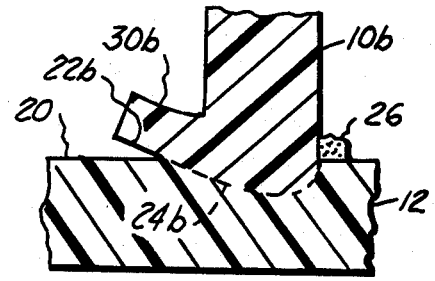
FIG. 6 is a fragmentary sectional view showing the welded joint between the parts shown in FIG. 5, after welding.

In accordance with the invention, the out-of-parallel relationship of the surfaces which form the weld joint may be provided by a combination of beveled surfaces, flexural lips, and controlled support of parts. FIGS. 5 and 6 illustrate a joint with both beveled surface and flexural lip, before and after welding. The upper section 10b has a lip 30b and the lower surface 22b is beveled along its entire width. An asymmetric weld zone is produced, as illustrated by the dashed line 24b in FIG. 6.

Figure 5A:
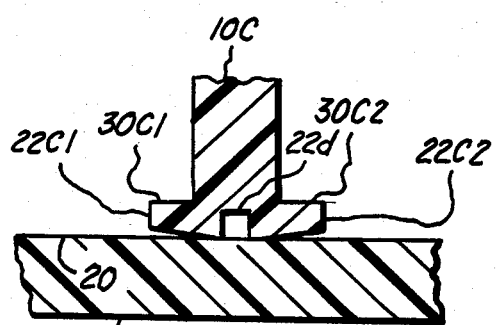
FIG. 5A is another fragmentary sectional view illustrating plastic parts used in accordance with still another embodiment of the invention to provide an improved joint which is stress relieved on both edges of the joint.

In the event that sealing of both the inside and outside edges of the weld joint is desired, one of the parts 10c in FIG. 5A may be provided with two lips 30c1 and 30c2. Beveled surfaces 22c1 and 22c2 extend from a center region outwardly under both lips, with a flash trap groove 22d provided to hold flash flow at the center of the weld. Substantial stress relief, both along the inside and outside edges of the weld joint, may be obtained when the surfaces 20 and 22c are brought together during welding.

Referring to FIG. 7 there is shown a channel-shaped plastic part 40 with side legs 41 and 43 which extend upwardly. The part is supported in tooling 39a and 39b. A support member or cross-piece 42 is vibrated by a drive element (not shown) of the vibration welding machine, which enters into a pocket 44 in the support member or cross-piece 42. The cross-piece has flanges 46 and 48. The outer ends of the flanges are provided with lips 50 and 52. These lips are flexural. Compressive forces are provided by tooling plates 54 and 56, and by the lower tooling members 39b, which bear against the flanges 46 and 48. Because of sufficient clearance to tooling plates 54 and 46, the lips 50 and 52 are free to bend under pressure. Immediately behind the lips grooves 58 and 60 serve both as flash traps and to reduce the cross section of the flanges immediately adjacent to the lips 50 and 52. The lips are thus effectively pivotly mounted by a flexural region of the flanges to facilitate their flexure (rotation and bending) during welding. The non-parallel relationship between adjoining surfaces of flanges 46 and 48 and lips 50 and 52, and the non-uniform heating and melting which results during welding, thereby blocks external flash flow, forms an asymmetrical weld zone, and stress relieves the exposed edges of the welded joint. The joints are thus self-sealed against solvent-induced cracking or crazing.

Figure 8:
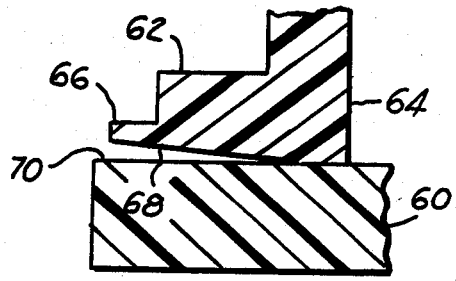

Referring to FIG. 8, there is shown an upper part 64 with a flange 62 and a lower part 60, the surfaces 68 and 70 of which join during welding. The part 64 is provided with both a beveled surface 68 and a flexural lip 66 which extends outwardly therefrom to the exposed or exterior side of the parts. When the parts are welded the non-parallel relationship of the surfaces 68 and 70 provide an asymmetrical joint which is stress relieved along the exposed edge thereof (to the left in FIG. 8).

Figure 9:
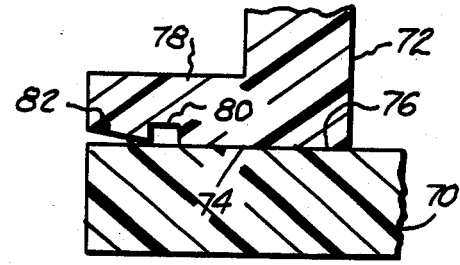

FIG. 9 shows an upper part 72 and a lower part 70, the surfaces 74 and 76 of which join during welding. The upper part 72 has a groove 80 in the lower flange 78. This groove 80 provides a flash trap. The outside end of the surface 74 is beveled as shown at 82 to provide for the non-parallel relationship between the surfaces during welding. An asymmetric welded joint which is sealed along the exposed edge (to the left in FIG. 9) is, therefore, produced upon welding.

Figure 12:
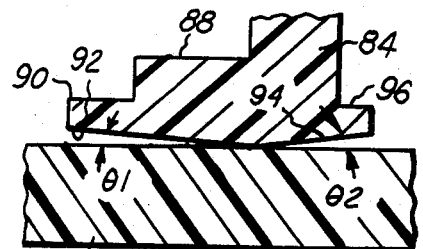

Referring to FIG. 12, the upper part 84 and the lower part 86 provide an asymmetric joint with a long, shallow slope through the use of a flange 88 with a flexural lip 90 along the outside edge. The lower surface of the upper part 84 has two beveled sections 92 and 94. The outside beveled section 92 is beveled over a longer width than the inside beveled section 94 and makes a shallower angle $\theta_1$, than the angle $\theta_2$ made by the inside beveled surface 94. The inside surface has a much thinner lip 96 than the lip 90 along the outside edge. This lip does not completely block flash flow, but serves to smooth the flow into a thin sheet. Stress risers in the otherwise irregular flash, such as illustrated in FIG. 2 at 26, are thereby eliminated by smoothing of the flash.

Figure 10:
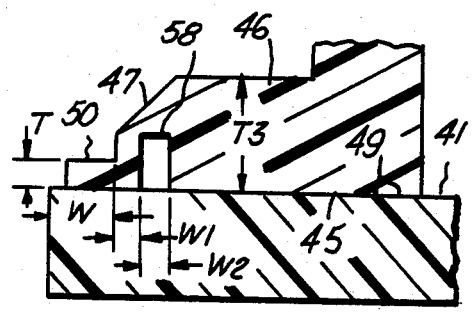

FIG. 10 illustrates a joint design similar to that shown in FIG. 7; the difference being that the upper edge 47 of the flange 46 is beveled to further enhance the pivotal flexibility of the lip 50. The surface 45 of the flange and lip adjoins the surface 49 of the side of the channel 41. FIG. 10 illustrates a preferred relationship of the dimensions of the portions of the various parts. In FIG. 10, the thickness (T) and width (W) of the lip 50, the thickness of support (W1), and the dimensions of the bevel 47 are chosen based upon material properties, expected welding conditions, and part sizes, so that sufficient flexure results during welding. The width (W2) and height of the flash trap groove 58 are based on the expected volume of flash, as determined by joint width and expected melt-down.

Figure 11:
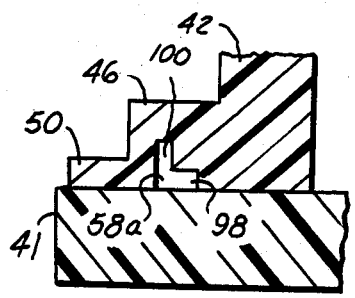

Referring to FIG. 11, there is shown a joint design which is similar to the design of the joint illustrated in FIG. 7, and like parts are indicated by like reference numerals. The principal difference between the joint shown in FIG. 11 and that shown in FIG. 7 is that the flash trap groove 58a has a stepped width, with a narrower width at its deeper portion 100 than at its shallow portion 98. The deeper portion 100 of the groove 58a at the upper end thereof provides a channel for release of trapped air which is not easily blocked by flash.

Figure 13:
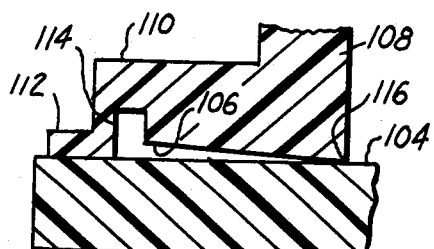
Figure 14:
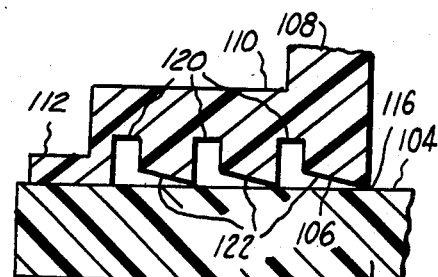

Referring to FIG. 13, the lower part 102 has a surface 104 which adjoins a surface 106 of the upper part 108. The upper part 108 has a flange 110 from which a lip 112 extends. A groove 114 extends along the surface 106. The portion of the surface 106 between the groove and the inside edge thereof is beveled or champered. This portion of the surface, as well as the surface of the lip 112, provides for the asymmetric flash flow and self-sealing action of the weld joint. The nonparallel beveled surface between the notch 114 and the inside edge 116 of the surface 106 also minimizes the required size of the notch 114 since it channels the majority of flash toward the inside edge of the joint.

Redundant sealing may be provided by a plurality of notches 120, between which separate beveled portions 122 of the surface 106 extend. Otherwise the joint shown in FIG. 14 and the joint shown in FIG. 13 are similar. Both provide flash flow control and self-sealing action along the exposed edge of the joint (to the left in FIGS. 13 and 14).

Figure 15:
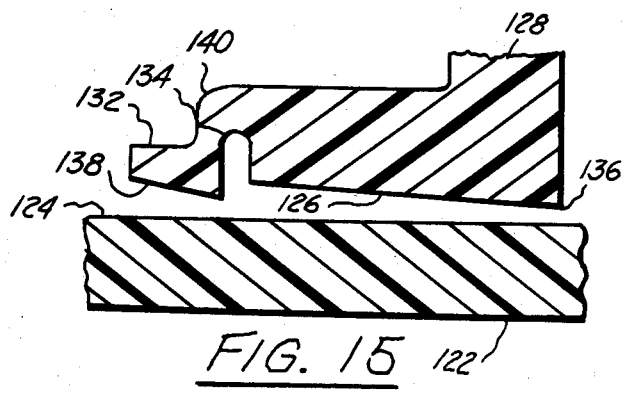

FIG. 15 illustrates a joint design similar to that shown in FIG. 13; the primary difference being that the joint surface 138 of the lip 132 is beveled. In combination with the flexural action of the lip, the beveled surface improves self-sealing action over a wider range of weld conditions. The radiused surface 140 increases the pivotal compliance of the lip, similar in action to the bevel 47, shown in FIG. 10.

Figure 16:
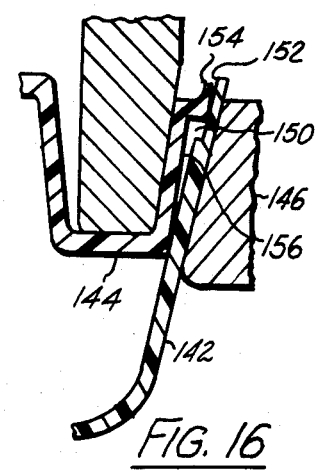

Referring to FIG. 16, there is shown a joint design comparable to the right-side joint shown in FIG. 7. The joint is between a channel shaped plastic part 142 (the side leg of which is shown extending upwardly) and a support member 144, as may be used, for example, in the assembly of two-piece plastic automobile bumpers. As shown, the pieces are supported in welder tooling members 146 and 148, which pinch together to provide compressive forces during welding. The joint design is similar in function to that shown in FIG. 15, including a beveled flexural lip 154 and beveled (non-parallel) joint surface 156, with a flash-trap channel isolating the lip from the body of the weld. Note, however, that the flash trap 150 is not a groove in one piece, but is instead formed by an offset in joint surfaces in both parts and by the relative clearances between those parts. By eliminating the groove, the cost and complexity of molding such parts may thereby be reduced. The molding of support plate 42 in FIG. 7 may, for example, involve a four-piece mold with mold draw in three directions, while a support plate with joints as shown in FIG. 15 requires only a two-piece mold, with single-axis mold draw.

Figure 17:
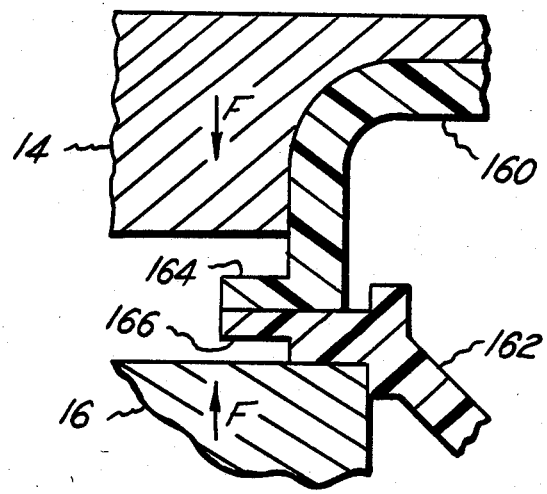

Referring to FIG. 17, there is shown a joint design similar to that shown in FIG. 3 between lamp housing 162 and lens 160 parts. The parts are shown as supported in welder tooling plates 14 and 16 prior to welding. In FIG. 17 however, both top and bottom parts 60 and 162 include flexural lips 164 and 166. The lips are of comparable dimensions (and therefor comparable compliance), are aligned with one another, and are unsupported during welding. The resulting weld between such parts experiences the non-uniform depth of melt and self-sealing action of other joints described above. The symmetric disposition of the lips 164 and 166 controls flash flow and improves stress-relief sealing, even under conditions where welder vibratory motion is nonparallel (i.e., perpendicular to the longitudinal axis of the joint). The vibratory motion may be from right to left and left to right in FIG. 17.

From the foregoing description it will be apparent that there has been provided improved methods for plastic welding and improved welded joints which have stress relieving properties so that they are self-sealing against solvent-induced cracking and crazing. Variations and modifications in the herein described methods and apparatus and in the joints themselves, within the scope of the invention, will undoubtedly suggest themselves to those skilled in the art. Accordingly the foregoing description should be taken as illustrative and not in a limiting sense.

I claim:

1. The method of welding plastic parts to provide a weld joint between surfaces thereof, which extend between opposite sides of said parts, with reduced stresses and reduced susceptibility to solvent induced cracking and crazing, which comprises the steps of locating at least one of said surfaces at an angle between 2 degrees and 30 degrees from the other of said surfaces thereby melting said at least one of said surfaces non-uniformly to provide a line of contact between said surfaces which progresses faster towards one of said opposite sides than the flow of molten material towards said one side and molten material is confined away from said one side and allowing said surfaces to fuse while in joined relationship whereby the weld joint is formed between said surfaces when they cool.

2. The method according to claim 1 further comprising the step of holding said surfaces together while allowing them to fuse.

3. The method according to claim 1 wherein said melting step is carried out by heating said surfaces to produce a non-uniform temperature distribution which increases in depth from at least one edge of said joint at said one side toward the center of said joint.

4. The method according to claim 3 wherein said one edge is on the outside or exposed side of said joint.

5. The method according to claim 1 wherein said melting step is carried out to produce a greater depth of melt on areas of said surface further from said one side of said parts than at said one side.

6. The method according to claim 1 wherein said melting step is carried out by vibrating said parts in a direction along said line of contact.

7. The method of welding of plastic parts which comprises the steps of heating surfaces of said parts which form a weld joint therebetween to melting temperature by vibrating at least one of said parts in a given direction, while bringing said surfaces together with at least portions thereof out of parallel relationship with a predetermined angle from 2 degrees to 30 degrees therebetween to form a line of contact extending in said direction which line of contact progresses more rapidly toward one of the opposite edges of said joint where said surfaces are furthest apart then does the molten material of said parts and said molten material is confined away from said one of said edges, to provide a weld joint in which stresses are relieved at least at the edge of said joint where said surfaces are furthest apart.

8. The method according to claim 7 wherein said out-of-parallel relationship is provided by beveling at least one of said surfaces in a direction laterally across said joint, and providing at least one of said parts with a lip which forms a portion of said beveled surface and is supported from said part.

9. The method according to claim 7 wherein said out-of-parallel relationship is provided by beveling at least one of said surfaces.

10. The method according to claim 9 wherein said beveling is in a direction laterally across said weld from the inside to the outside of said parts.

11. The method according to claim 9 wherein the angle provided by beveling is from 2 degrees to 30 degrees.

12. The method according to claim 7 wherein said out-of-parallel relationship is provided by providing a lip, on at least one of said parts which provides part of the surface thereof which forms said joint, which lip is free to flex when said surfaces are brought together under pressure during welding to provide said out-of-parallel relationship of said surfaces.

13. The method according to claim 12 wherein the surface of said lip is stepped outward toward the other of said parts, the surface of the other said part is stepped inward, and parts are brought together under pressure during welding with an offset relationship between said stepped surfaces, to provide a flash channel between said surfaces.

14. The method according to claim 12 wherein said lip is provided extending laterally from said joint.

15. The method according to claim 14 wherein said laterally extending lip is provided extending toward the outside of said parts.

16. The method according to claim 15 wherein said lip has a width and thickness selected to enable flexure thereof under pressure during welding.

17. The method according to claim 12 wherein said out-of-parallel relationship and said surface of one of said parts are provided by providing a pair of said lips extending laterally in opposite directions from said one part and each flexural on said one part.

18. The method according to claim 17 further comprising providing a flash trap groove in said surface of one of said parts between said lips.

19. The method according to claim 17 wherein said one part and another of said parts provide said joint, said surfaces are provided by beveling the portions of said surface containing said lips laterally from the center of said surface and outwardly away from the surface of said another of said parts which provide said joint.

20. The method according to claim 7 wherein said out-of-parallel relationship is provided by providing a flange on at least one of said parts which extends laterally therefrom and defines the surface of said one part which forms said joint, providing a groove in said surface forming a flash trap, and beveling said surface defined by said flange laterally outward from said groove.

21. The method according to claim 7 wherein said out-of-parallel relationship is provided by providing a flange on at least one of said parts which extends laterally therefrom and which defines the surface of said one part which forms said joint.

22. The method according to claim 21 wherein said flange is provided with a lip extending laterally thereon which is flexural on said flange, defines said surface of said one part, and is free to flex when said parts are brought together 23. The method according to claim 22 wherein said out-of-parallel relationship is provided by beveling said surface of said flange and said lip at an angle to its adjoining surface of the one of said parts adjacent thereto from two degrees to thirty degrees.

24. The method according to claim 23 wherein said beveling of the surface of said flange is laterally in opposite directions from a region intermediate the width of said flange, the angle of said beveling toward the outside of said parts being less than towards the inside of said parts.

25. The method according to claim 23 wherein said lip is provided with a beveled surface and said flange is also provided with a beveled surface tapering in the same direction as the beveled surface of said lip away from the surface of the other of said parts in the direction toward the outside edge of said joint.

26. The method according to claim 22 wherein said surface of said flange is provided with a groove forming a flash trap extending longitudinally along the surface of said flange.

27. The method according to claim 26 wherein said groove is of sufficient volume to contain resulting flash with reserve volume for escape of trapped air, and where the location of said groove and the thickness and width of said lip are selected to produce flexure of said lip.

28. The method according to claim 26 wherein said groove has a stepped width and is provided with a wider portion along the shallow portion thereof than along the deeper portion thereof, to provide a duct for escape of trapped air through said deeper portion which is not easily blocked by flash.

29. The method according to claim 26 wherein said flange is beveled across the corner thereof adjacent to said lip to provide a region in said flange about which said lip pivots as it flexes.

30. The method according to claim 26 wherein a portion of said flange is provided with a beveling of said surface, tapering from the inside edge of said joint laterally toward said flash trap groove.

31. The method according to claim 30 wherein said surface of said flange is provided with a plurality of said longitudinally-extending grooves spaced from each other laterally across said surface of said flange, and said surface is provided with beveling of said flange, between said grooves, tapering inwardly in the direction of said lip.

32. The method according to claim 7 wherein said out-of-parallel relationship is provided by providing a pair of lips on each of said parts which provide part of the surfaces thereof which form said joint, said lips being disposed in symmetric relationship about the plane of said joint and being free to flux when said surfaces area brought together during welding.

33. Plastic parts having a welded joint formed in accordance with the method set forth in any of claims 1 through 32.

* * * * *